US006677412B2

(12) United States Patent
Ihm et al.

(10) Patent No.: US 6,677,412 B2
(45) Date of Patent: Jan. 13, 2004

(54) PROCESS FOR PREPARING A HIGHLY ACTIVE METALLOCENE CATALYST SUPPORTED ON POLYMER BEAD FOR OLEFIN POLYMERIZATION

(75) Inventors: Son-Ki Ihm, Seoul (KR); Ki-Soo Lee, Taejon (KR); O-Yong Jeong, Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 134 days.

(21) Appl. No.: 10/118,617

(22) Filed: Apr. 2, 2002

(65) Prior Publication Data

US 2003/0073782 A1 Apr. 17, 2003

(30) Foreign Application Priority Data

Jul. 9, 2001 (KR) .................................. 2001-0040747

(51) Int. Cl.[7] .................................................. C08F 4/44
(52) U.S. Cl. ........................ 526/160; 526/170; 526/904; 526/348; 502/402; 502/507; 502/81
(58) Field of Search ................................. 526/904, 160, 526/170, 348, 943; 502/802, 507, 81

(56) References Cited

U.S. PATENT DOCUMENTS

| 4,258,206 A | * | 3/1981 | Pittman et al. ............. 560/233 |
| 4,540,679 A | * | 9/1985 | Arzoumanidis et al. .... 502/111 |
| 5,237,047 A | * | 8/1993 | Keijsper ...................... 528/392 |
| 5,409,875 A | * | 4/1995 | Hsu et al. .................... 502/109 |
| 5,587,439 A | * | 12/1996 | DiMaio ....................... 526/142 |
| 5,939,494 A | * | 8/1999 | Wehmeyer et al. ....... 525/333.5 |
| 6,013,594 A | * | 1/2000 | Yang et al. .................. 502/103 |
| 6,153,551 A | * | 11/2000 | Kissin et al. ............... 502/110 |
| 6,441,230 B1 | * | 8/2002 | Schiodt et al. ............. 562/879 |
| 2003/0073782 A1 | * | 4/2003 | Ihm et al. .................... 525/241 |
| 2003/0109379 A1 | * | 6/2003 | Yoon et al. .................. 502/152 |

FOREIGN PATENT DOCUMENTS

| DE | 197 06 409 A1 | * | 8/1998 | ........... C08F/10/00 |
| JP | 2001-252572 A | * | 9/2001 | ........... B01J/31/26 |

OTHER PUBLICATIONS

Grubbs, R.H. et al., Activation of Homogeneous Catalysts by Polymer Attachment, *J. Am. Chem. Soc.*, 95:2373–2375 (1973).
Bonds, W.D., Jr. et al., Polystyrene Attached Titanocene Species. Preparation and Reactions, *J. Am. Chem. Soc.*, 97(8):2128–2132 (1975).
Koivumäki, J. et al., Observations on the Rate Enhancement Effect with $MgCl_2/TiCl_4$ and $Cp_2ZrCl_2$ Catalyst Systems upon 1–Hexene Addition, *Macromolecules*, 26(21):5535–5538 (1993).
Chien, J.C.W. et al., Ethylene–Hexene Copolymerization by Heterogeneous and Homogeneous Ziegler–Natta Catalysts and the "Comonomer" Effect, *J. Polym. Sci.: Part A: Polym. Chem.*, 31:227–237 (1993).
Soga, K. et al., Polymerization of Propene with Zirconocene–containing Supported Catalysts Activated by Common Trialkylaluminiums, *Makromol. Chem.*, 194:1745–1755 (1993).
Soga, K. et al., Polymerization of Propene with a rac–$(CH_3)_2Si(2,4$–$(CH_3)_2(C_5H_3)(3',5'$–$(CH_3)_2C_5H_3)ZrCl_2$/ MAO/$SiO_2$–Al$(iC_4H_9)_3$ Catalyst System, *Macromol. Rapid Commun.*, 15:593–600 (1994).
Nishida, H. et al., Polystyrene–supported Metallocene Catalysts for Olefin Polymerizations, *Macromol. Rapid Commun.*, 16:821–830 (1995).
Mteza, S.B. et al., A Study of Polyethylene–gr–2–tert–butyl Amino Methacrylate–Supported $TiCl_4$ Catalyst for Ethylene Polymerization, *J. Polym. Sci.: Part A: Polym. Chem.*, 34:1693–1702 (1996).
Yim, J.H. et al., Syndiospecific Polymerization of Styrene over Silica Supported $CpTiCl_3$ Catalysts, *Eur. Polym. J.*, 32(12):1381–1385 (1996).
Quijada, R. et al., The Influence of the Comonomer in the Copolymerization of Ethylene with α–Olefins using $C_2H_4$ $[Ind]_2ZrCl_2$/methylaluminoxane as Catalyst System, *Macromol. Chem. Phys.*, 197:3091–3098 (1996).
Jo, Y.D. et al., Hydrogenation of Olefins over Palladium (II) Complexes Supported on a Modified Macroporous Polymer Bead, *Polym. Int.*, 44:49–54 (1997).
Roscoe, S.B. et al., Polyolefin Spheres from Metallocenes Supported on Noninteracting Polystyrene, *Science*, 280:270–273 (1998).
Kaminsky, W. et al., Hydrogen Transfer Reactions of Supported Metallocene Catalysts, *J. Mol. Catal. A: Chem.*, 128:191–200 (1998).
Kim, Y. et al., (Pentamethylcyclopentadienyl)titanatrane: A New Class of Catalyst for Syndiospecific Polymerization of Styrene, *Organometallics*, 18(1):36–39 (1999).
Liu, S. et al., Preparation of Polymer–Supported Zirconocene Catalysts and Olefin Polymerization, *J. Appl. Polym. Sci.*, 71:2253–2258 (1999).
Kishi, N. et al., Synthesis of Polymer Supported Borate Cocatalysts and Their Application to Metallocene Polymerizations, *Polymer*, 41:4005–4012 (2000).
Lee, K.S. et al., Characteristics of Zirconocene Catalysts Supported on Al–MCM–41 for Ethylene Polymerization, *J. Mol. Catal. A: Chem.*, 159:301–308. (2000).

* cited by examiner

*Primary Examiner*—David W. Wu
*Assistant Examiner*—Rip A Lee

(57) ABSTRACT

The present invention relates to a process for preparing a highly active metallocene catalyst supported on polymer bead for olefin polymerization, a metallocene catalyst prepared by the said process and a method for alkylene polymerization by employing the said catalyst. The process for preparing a highly active metallocene catalyst supported on polymer bead for olefin polymerization which comprises the steps of: dissolving divinylbenzene, vinylbenzylchloride, and an initiator in an organic solvent, mixing it with a suspension stabilizer of aqueous phase, and carrying out suspension-polymerization at the temperature of 40 to 80° C. to obtain polystyrene; swelling the polystyrene in dialcoholamine dissolved in an organic solvent at ambient temperature for 1 to 3 days, to give a polymer having a functional group of dialcoholamine; and, reacting the polymer with a metallocene compound (CpM*$Cl_3$) dissolved in an organic solvent. The metallocene catalyst of the present invention can be used widely for ethylene polymerization, styrene polymerization and copolymerization, while replacing the conventional homogeneous catalysts.

11 Claims, No Drawings

PROCESS FOR PREPARING A HIGHLY ACTIVE METALLOCENE CATALYST SUPPORTED ON POLYMER BEAD FOR OLEFIN POLYMERIZATION

FIELD OF THE INVENTION

The present invention relates to a process for preparing a highly active metallocene catalyst supported on polymer bead for olefin polymerization, more specifically, to a process for preparing a highly active metallocene catalyst supported on polymer bead for olefin polymerization, which comprises the steps of suspension-polymerization to obtain polystyrene, conferring a functional group of dialcoholamine on the polymer support to give a functional polymer support and reacting the functional polymer support with a metallocene compound (CpM*Cl$_3$) dissolved in an organic solvent, a metallocene catalyst prepared by the said process and a method for alkylene polymerization by employing the said catalyst.

BACKGROUND OF THE INVENTION

Metallocene catalyst, an organometallic compound which is used for olefin polymerization, though it has many advantages, has major two problems upon commercial application: First, it is very difficult to control morphology of the polymer produced by employing a homogeneous catalyst, which may cause the flocculation on the wall of a reactor; Secondly, the use of an excess amount of methyl aluminoxane (MAO) as a cocatalyst for maximum activity accompanies an essential step of separating residual aluminum beause the produced polymer contains a large amount of aluminum. Therefore, a homogeneous metallocene catalyst cannot be applied in the gaseous process or the slurry process which is practically applied in the art. To overcome these problems, alternative method was developed, in which a metallocene catalyst was supported on metal oxides such as silica, alumina, etc. to give a heterogeneous metallocene catalyst. However, the said method is aimed to improve the efficiency of a separating process and a manufacturing process and to improve the properties of produced polymer such as molecular weight, melting point, etc., rather than to improve the characteristics of a polymerization reaction.

U.S. Pat. No. 4,808,561 discloses a process for preparing a silica-supported catalyst for use in a gaseous process, and Soga et al. teached olefin polymerization by using a zirconocene catalyst supported on the metal oxide (see: Soga, Markromol. Chem., 194:1745, 1993). Recently, Soga and Frechet proposed a catalyst supported on an organic support, i.e., a gel-type functional polymer of polystyrene whose cation is exchanged (see: Soga, Polymer, 41:4005, 2000; Frechet, Science, 280:270, 1998).

However, the prior metallocene catalysts produced by the conventional methods have a low activity and cannot produce a polymer having the properties of a constant range since the properties of a polymer such as structure, length, etc. may be changed depending on the reaction conditions. Naturally, there have been needs for developing a highly active polymer-supported metallocene catalyst with the increased amount of metallocene catalyst for olefin polymerization, while possessing the excellent material properties such as molecular weight, melting point and so on.

Accordingly, there are strong reasons for exploring and developing an improved process for preparing a metallocene catalyst which has a high activity equivalent to that of a homogeneous catalyst without treatment of co-catalyst and can produce an olefinic polymer having the excellent material properties.

SUMMARY OF THE INVENTION

The present inventors have made an effort to solve the problems of conventional processes for preparing highly active metallocene catalysts which are used for preparing an olefinic polymer with the excellent material properties, and found that a catalyst wherein metallocene compound is bonded to a polystyrene having a functional group of dialcoholamine has a high activity without treatment of cocatalyst and can be used for the preparation of an olefinic polymer having excellent material properties.

A primary object of the present invention is, therefore, to provide a process for preparing a highly active metallocene catalyst supported on polymer bead for olefin polymerization.

The other object of the invention is to provide a metallocene catalyst prepared by the said process.

Another object of the invention is to provide a method for polymerization of alkylene by employing the metallocene catalyst.

DETAILED DESCRIPTION OF THE INVENTION

The process for preparing a highly active metallocene catalyst supported on polymer bead for olefin polymerization which comprises the steps of:

(i) dissolving divinylbenzene, vinylbenzylchloride, and an initiator in an organic solvent, mixing it with a suspension stabilizer of aqueous phase, and carrying out suspension-polymerization at the temperature of 40 to 80° C. to obtain polystyrene;

(ii) swelling the polystyrene in dialcoholamine dissolved in an organic solvent at ambient temperature for 1 to 3 days, to give a polymer having a functional group of dialcoholamine; and, (iii) reacting the polymer with a metallocene compound (CpM*Cl$_3$) dissolved in an organic solvent.

The process for preparing a highly active polymer-supported metallocene catalyst for olefin polymerization of the present invention is illustrated in more detail by the following steps.

Step 1: Obtainment of Polystyrene

Divinylbenzene, vinylbenzylchloride and an initiator are dissolved in an organic solvent, and mixed with a suspension stabilizer of aqueous phase, and suspension-polymerization is carried out at the temperature of 40° C. to 60° C. to obtain a polystyrene, where toluene is preferably used for the organic solvent and 2, 2'-azobis (isobutyronitrile)(AIBN) is preferably used for the initiator and biozan R, cellosize, boric acid, NaCl or mixture thereof is preferably used for the suspension stabilizer. Degree of cross-linking of the polystyrene preferably ranges from 5% to 75%.

Step 2: Obtainment of Polymer Support

The polystyrene obtained in Step 1 is swelled in dialcoholamine dissolved in an organic solvent at ambient temperature for 1 to 3 days, to give a polymer having a functional group of dialcoholamine, where diethanolamine is preferably used for the dialcoholamine and dioxane is preferably used for the organic solvent.

Step 3: Preparation of Metallocene Catalyst

The polymer obtained in Step 2 is reacted with a metallocene compound (CpM*Cl$_3$) dissolved in an organic solvent, where the metallocene compound contains preferably a metal of Ti, Zr, Hf, etc., and ether or toluene is preferably used for the organic solvent. The polymer support is reacted with a metallocene compound by one of the following two methods: First, the polymer is reacted with the 2 equi. of BuLi to be lithiated, which is reacted with a metallocene compound in ether at −78° C. for 6 hr; Secondly, the polymer support is reacted with a metallocene compound in toluene.

The metallocene catalyst prepared by the present invention can be used for the polymerization of alkylene or copolymerization of alkylene and α-olefin. Polymerization of alkylene is performed by adding the metallocene catalyst and aluminoxane as a cocatalyst to alkyene dissolved in an organic solvent and reacting the resultant solution under a condition of 20° C. to 80° C. and 1 to 15 atm for 300 min. Copolymerization of alkylene and α-olefin is performed in a similar manner as the above except for using a mixture of alkyene and 10 to 1000% (molar ratio, against alkylene) of α-olefin dissolved in an organic solvent. Cocatalyst is preferably used in a molar ratio of Al in the cocatalyst to Ti in supported-catalyst ranges 100 to 10,000.

The metallocene catalyst of the present invention can be used widely for ethylene polymerization, styrene polymerization and copolymerization, while replacing the conventional homogeneous catalysts.

The present invention is further illustrated in the following examples, which should not be taken to limit the scope of the invention.

EXAMPLE 1

Preparation of a Metallocene Catalyst Supported on Polymer Bead 68.95 g of vinylbenzylchloride, 33.14 g of divinyl benzene (55%) and 0.1 g of azobisisonitrile were dissolved in 100 ml of toluene, and mixed with 600 ml of aqueous solution of 0.90 g biozane R, 0.05 g cellosize, 2.5 g boric acid and 60 g NaCl. Then, the resultant was polymerized at 60° C. to obtain polystyrene with the degree of cross-linking of 20% and the surface area of 5 to 1000 m$^2$/g. And then, the polystyrene thus obtained was put into 150 ml of diethanolamine-dissolved dioxane, and swollen for 3 days to give a polymer support having alcohol group. Then, the polymer support was reacted with 2 equi. of butyllithium and added to a solution of CpTiCl$_3$ dissolved in ether at −78° C. to react with it for 6 hours, followed by washing and drying to prepare a metallocene catalyst containing CpTiCl$_3$.

EXAMPLE 2

Ethylene Polymerization

To compare the activity of a metallocene catalyst of the invention with that of a homogeneous catalyst, ethylene polymerization was carried out for 3 experimental groups and the results were compared with one another: That is, Group 1 was prepared by adding a metallocene catalyst containing CpTiCl$_3$ prepared in Example 1, to a solution of ethylene dissolved in 100 ml of toluene and polymerizing under a condition of 50° C. and 8 atm; Group 2 was prepared in a similar manner as in Group 1, except for employing a mixed catalyst containing the said metallocene catalyst and MAO in a molar ratio of Ti/Al of 1:1000 instead of the said metallocene catalyst; and, Group 3 was prepared in a similar manner as in Group 1, except for a mixed catalyst containing 5.74×10$^{-6}$ mol of homogeneous CpTiCl$_3$ catalyst and MAO in a molar ratio of Ti/Al of 1:1000 instead of the said metallocene catalyst. Then, the results of each group were compared with one another (see: Table 1).

TABLE 1

Comparison of the polymerization activity in ethylene polymerization

| Experimental group | Polymerization activity (kg PE/mol-Ti hr) | M.P. (° C.) | Average M.W. |
|---|---|---|---|
| 1 | 5.090 | 141.0 | 21.350 |
| 2 | 2.130 | 140.3 | 22.780 |
| 3 | 3.000 | 140.1 | 15.230 |

As shown in Table 1 above, it was clearly demonstrated that: Group 1 ranked the first in terms of polymerization activity and the average molecular weight was similar to that of Group 2; and, the melting points were similar to one another, indicating that the activity of a metallocene catalyst of the invention is equivalent to that of a homogeneous catalyst.

EXAMPLE 3

Comparison of the Polymerization Activity in Ethylene Polymerization Depending on Reaction Condition Effects of reaction conditions in ethylene polymerization were examined. A polymer support was reacted with 2 equi. of butyllithium, and a metallocene catalyst containing CpTiCl$_3$ was prepared in a similar manner as in Example 1, except for adding the polymer carrier to a solution of CpTiCl$_3$ dissolved in toluene of high temperature to react with it for 2 hours instead of adding the polymer carrier to CpTiCl$_3$-dissolved ether of −78° C. to react with it for 6 hours. Then, ethylene polymerization was carried out with varied reaction conditions such as mixing ratio of metallocene catalyst and cocatalyst (MAO), reaction temperature and reaction pressure, and the results were compared with one another (see: Table 2).

TABLE 2

Comparison of the polymerization activity in ethylene polymerization depending on reaction conditions

| MAO/catalyst (molar ratio) | Temp. (° C.) | Pressure (atm) | Polymerization activity (kg PE/mol-Ti hr) | M.P. (° C.) | Average M.W. |
|---|---|---|---|---|---|
| 500 | 50 | 8 | 4.460 | 139.7 | 19.360 |
| 1.000 | 50 | 8 | 5.370 | 141.6 | 22.750 |
| 2.000 | 50 | 8 | 4.950 | 141.5 | 23.540 |
| 3.000 | 50 | 8 | 4.710 | 142.1 | 24.360 |
| 1.000 | 20 | 8 | 3.560 | 142.2 | 24.520 |
| 1.000 | 80 | 8 | 6.210 | 141.0 | 20.890 |
| 1.000 | 50 | 2 | 1.330 | 135.3 | 13.680 |
| 1.000 | 50 | 4 | 2.340 | 136.8 | 16.770 |
| 1.000 | 50 | 6 | 4.360 | 137.1 | 17.900 |

As shown in Table 2 above, it was clearly demonstrated that polymerization activity was highly affected by the parameter of pressure and dependent on the parameter of reaction temperature.

EXAMPLE 4

Effects of Hexene on Ethylene Polymerization

To examine the effects of hexene on ethylene polymerization, the ethylene polymerization was performed with the addition of 1-hexene, by employing a metallocene catalyst of the invention and a homogeneous catalyst.

A group was prepared by adding a mixed catalyst in which a metallocene catalyst containing $CpTiCl_3$ prepared in Example 1, and a cocatalyst of MAO were mixed in a molar ratio of Ti/Al of 1:1000 to a solution of ethylene and 1-hexene dissolved in 100 ml of toluene, and pressurized the mixture to reach a molar ratio of ethylene to 1-hexene of 1:1, and polymerizing at 50° C. for 30 min. The other group was prepared in a similar manner as in the said group, except for employing a homogeneous $CpTiCl_3$ catalyst instead of the said metallocene catalyst. Comparison of the results of the two groups has revealed that polymerization was not performed in case of employing the homogeneous catalyst.

Accordingly, polymerization was carried out by using the metallocene catalyst of the invention, with varied ratios of ethylene and 1-hexene, and then, the results depending on the ratio of ethylene and 1-hexene were compared with one another (see: Table 3).

TABLE 3

Polymerization activity depending on the ratio of ethylene and 1-hexene

| Ratio of ethylene to hexene (mole/mole) | Temp. (° C.) | Polymerization activity (kg PE/mol-Ti hr) | M.P. (° C.) | Average M.W. | Hexane polymer content (%) |
|---|---|---|---|---|---|
| 1 | 20 | 1.074 | 110.1 | 4.080 | 3.6 |
| 1 | 80 | 1.441 | 102.7 | 3.290 | 4.7 |
| 0.5 | 50 | 3.025 | 114.9 | 3.670 | 2.7 |
| 1 | 50 | 2.181 | 100.8 | 3.250 | 9.8 |
| 2 | 50 | 963 | 87.1 | 2.760 | 18.5 |

As shown in Table 3 above, it was clearly demonstrated that the metallocene catalyst of the invention shows a higher catalytic activity of copolymerization than that of the homogeneous $CpTiCl_3$ catalyst.

EXAMPLE 5

Styrene Polymerization

The activities of a metallocene catalyst of the invention and a homogeneous catalyst in styrene polymerizatin were compared with each other: That is, a group was prepared by adding a mixed catalyst in which the metallocene catalyst containing $CpTiCl_3$ prepared in Example 1, and a cocatalyst of MAO were mixed in a molar ratio of Ti/Al of 1:1000 to a solution of styrene dissolved in 100 ml of toluene in a ratio of 5 to 30% (w/w), and polymerizing under a condition of 50° C. and 8 atm for 30 min. The other group was prepared in a similar manner as in the said group, except for employing $5.74 \times 10^{-6}$ mol of homogeneous $CpTiCl_3$ catalyst instead of the said metallocene catalyst. Comparison of the two groups showed similar results as in Example 2, indicating that the metallocene catalyst of the invention can be applied to styrene polymerization.

As clearly illustrated and demonstrated as aboves, the present invention provides a process for preparing a highly active metallocene catalyst supported on polymer bead for olefin polymerization, a metallocene catalyst prepared by the said process and a method for alkylene polymerization by employing the said catalyst. The metallocene catalyst of the invention can be used widely for ethylene polymerization, styrene polymerization and copolymerization, while replacing the conventional homogeneous catalysts.

What is claimed is:

1. A process for preparing a highly active metallocene catalyst supported on polymer bead for olefin polymerization which comprises:

(i) dissolving divinylbenzene, vinylbenzylchloride, and an initiator in an organic solvent, mixing the resulting organic solution with a suspension stabilizer of aqueous phase, and carrying out suspension-polymerization to obtain a polystyrene;

(ii) swelling the polystyrene obtained from step (i) in dialcoholamine dissolved in an organic solvent to give a polymer having a functional group of dialcoholamine; and, (iii) reacting the polymer with a metallocene compound $CpM*Cl_3$ dissolved in an organic solvent.

2. The process for preparing a highly active metallocene catalyst supported on polymer bead for olefin polymerization of claim 1, wherein the organic solvent of step (i) is toluene.

3. The process for preparing a highly active metallocene catalyst supported on polymer bead for olefin polymerization of claim 1, wherein the initiator of step (i) is 2, 2'-azobisisonitrile (AIBN).

4. The process for preparing a highly active metallocene catalyst supported on polymer bead for olefin polymerization of claim 1, wherein the suspension stabilizer of step (i) is welan gum, hydroxyethyl cellulose, boric acid, NaCl or mixture thereofs.

5. The process for preparing a highly active metallocene catalyst supported on polymer bead for olefin polymerization of claim 1, wherein the degree of cross-linking is 5 to 75%.

6. The process for preparing a highly active metallocene catalyst supported on polymer bead for olefin polymerization of claim 1, wherein the organic solvent of step (ii) is dioxane.

7. The process for preparing a highly active metallocene catalyst supported on polymer bead for olefin polymerization of claim 1, wherein the metallocene compound comprises Ti, Zr of Hf.

8. The process for preparing a highly active metallocene catalyst supported on polymer bead for olefin polymerization of claim 1, wherein the organic solvent of step (iii) is an ether or toluene.

9. A highly active metallocene catalyst for olefin polymerization produced by the process of claim 1.

10. A method for alkylene polymerization which comprises adding the metallocene catalyst of claim 9 and a cocatalyst of methylaluminoxane to alkylene dissolved in an organic solvent, and reacting under a condition of 1 to 15 atm and 20 to 80° C. for 30 to 300 min.

11. A method for polymerization of a first alkylene and a second alkylene, the method comprising adding the metallocene catalyst of claim 9 and a cocatalyst of methylaluminoxane to a mixture of the first alkylene and 10 to 1,000 mole %, based on the first alkylene, of the second alkylene dissolved in an organic solvent, and reacting under a condition of 1 to 15 atm and 20 to 80° C. for 30 to 300 min.

* * * * *